350-377 SR
XR 3,106,881
[redacted]
SEARCH ROOM
CROSS REFERENCE

X2674

Oct. 15, 1963 K. N. KAPUR 3,106,881

RECORDING AND PRINTING APPARATUS

Filed Sept. 20, 1960 2 Sheets-Sheet 1

INVENTOR
KISHEN N. KAPUR

BY Leo J. Aubel
ATTORNEY

3106881
OR IN 354/17

United States Patent Office 3,106,881
Patented Oct. 15, 1963

3,106,881
RECORDING AND PRINTING APPARATUS
Kishen N. Kapur, Owego, N.Y., assignor to International Business Machines Corporation, New York, N.Y., a corporation of New York
Filed Sept. 20, 1960, Ser. No. 57,294
8 Claims. (Cl. 95—4.5)

Figure 1:
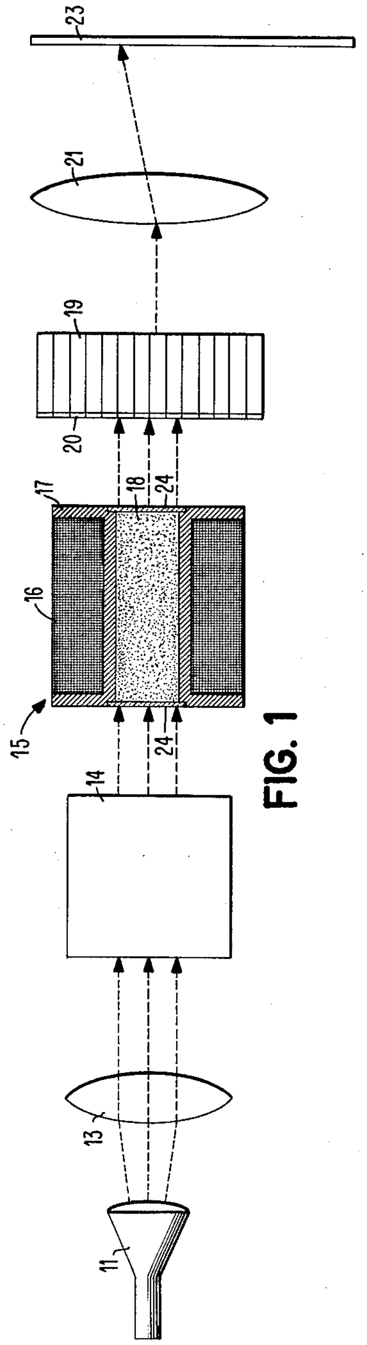

The present invention relates to apparatus for controlling a light beam, and more particularly to an apparatus for utilizing the controlled rotation of a polarized beam to provide a recording and printing apparatus.

There are many varieties of printing and recording apparatus known in the art. However, prior art printers are relatively complex with all the disadvantages inherent in complex devices and are also relatively slow. In a number of instances, the printers have numerous moving parts which are, of course, susceptible to wear and malfunction.

Prior art recording or indicating apparatus, such as oscillographs, also comprise mechanical units utilizing pens for recording on a paper strip. Other types of oscillographs comprise light beam deflecting galvanometer instruments which scan a light beam over a sensitized paper. Mechanical units have inherent disadvantages regarding limitations as to speed of operation and/or "wear" characteristics while galvanometers have the disadvantages of being rather delicate, since the galvanometer suspension is easily damaged as a result of a momentary over-voltage shock or as a result of rough handling.

Accordingly, it is a principal object of the invention to provide an improved instrument for deflecting light beams over a sensitized paper in an intelligible manner.

It is another object of the invention to provide a light beam deflecting apparatus which has no moving parts and which operates at a fast rate.

It is yet another object of the invention to provide a high speed printing system.

It is still another object of the invention to provide an electrically controlled printing system with no moving parts.

In the attainment of the foregoing objects, in a basic form of the invention, there is provided a recording system including a polarizer for polarizing the received light, a device for rotating the plane of the polarized light in response to a controlled energization and an analyzer matrix which receives the light rotating means. The analyzer matrix comprises a plurality of elements; the plane of polarization of succeeding elements in the matrix is arranged to progressively change so that light rays having different planes of polarization are passed by the different elements in the matrix to thereby provide an output which is a function of the energization applied to the rotating device.

Figure 2:
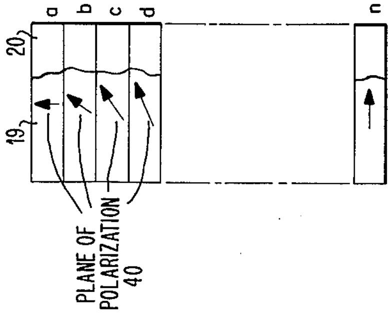
Figure 3:
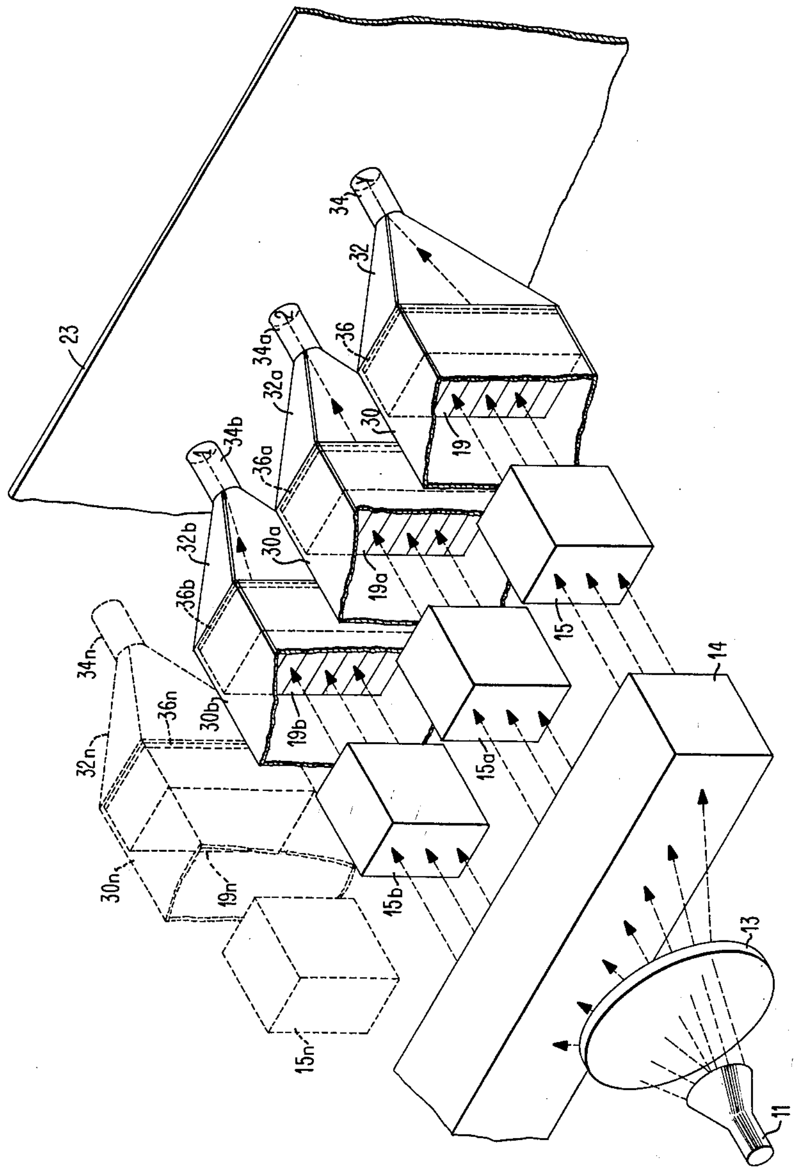

The foregoing and other objects, features and advantages of the invention will be apparent from the following more particular description of preferred embodiments of the invention, as illustrated in the accompanying drawings in which similar reference characters refer to like elements and in which:

FIG. 1 is a schematic showing of an embodiment of a light deflecting system according to the invention, FIG. 2 is a view partly in section showing the analyzer matrix of FIG. 1 in enlarged scale, and FIG. 3 shows an embodiment of a system according to the invention used as a printer.

Referring to FIG. 1, a source of light of constant intensity, such as lamp 11, has its rays, indicated by the dotted lines, directed through a lens 13. The rays emerging from lens 13 are directed through a polarizer 14 which may be in the form of Nicol prism which, as is known, plane polarizes the incident rays of light. The light rays emerging from the polarizer 14 are directed through a device 15 for rotating the plane of the polarized light. Device 15 may comprise a coil 16 wound on a core 17. The light rays are directed to pass through an electrically optical active medium 18 placed in core 17 which medium may comprise, for example, a composition of iron, cobalt, nickel, carbon disulfide, glass, or any other material in which a beam of polarized light rotates considerably when subjected to a magnetic field developed by current flowing through coil 16. The external sources of potential, for controlling the voltage developed across the terminals of coil 16 and thus the current flowing through said coil, may be of any suitable type, and since they are per se not a part of this invention, they are not shown. The medium 18 is held in core 17 by glass plates 24.

A device, such as device 15, is shown in, for example, United States Patent No. 1,773,980 to P. T. Farnsworth, now expired. Although the foregoing is a magnetic type device, other known devices for rotating the light electrostatically may also be employed.

Device or rotator 15 rotates the polarized light an amount dependent on the magnitude of the current flowing through coil 16. The light rays emerging from rotator 15 are directed to an analyzed matrix 19, which matrix will be described in detail hereinbelow, and then through a second condensing lens 21 to a viewing surface or recording media, for example, a sensitized paper 23.

Referring now also to FIG. 2, the analyzer matrix 19 comprises a plurality of elements, individually designated as *a*, *b*, *c* . . . *n*, which elements are stacked on one another. A thin transparent sheet which may be of quartz is positioned adjacent each of the elements of matrix 19 and between each of said elements and rotator 15. A distinct sheet is provided for each element; collectively, the sheets are designated by the numeral 20.

The sheets 20 are included for the purpose of providing a phase shift of the light rays from rotator 15, if required.

Each element of matrix 19 comprises a light polarizing material of any suitable known type. The elements are prepared as polarizing filters, that is, with their planes of polarization 40 arranged in distinct directions. Only those light rays which are polarized in the same direction as the plane of polarization 40 of a given element are passed by that element.

The plane of polarization 40 of element *a* may be considered to be vertically oriented and the plane of polarization 40 of each succeeding element, i.e., elements *b*, *c* . . . *n*, to be turned progressively toward the horizontal with element *n* having its plane of polarization 40 in a horizontal direction. The number of polarizer elements used is essentially unlimited, and the resolution of the analyzer may be increased by using a larger number of elements.

Although in the embodiment shown it is preferred to employ a matrix comprising stacked elements, a single plate having a plane of polarization which changes along its length might also be used in place of matrix 19.

The operation of the light deflecting system of FIG. 1 will now be described. Light rays from the source 11 are plane polarized by polarizer 14. The plane polarized light is rotated by rotator 15. The axis of polarization of the light emerging from the rotator 15 is a function of applied electric field and is determined by external control means, not shown. The plane of polarization of the rays of light emerging from rotator 15 will thus be rotated an amount depending on instantaneous amplitude of the control voltage.

Assume that rotator 15 is arranged to pass vertically oriented light rays when a minimum voltage is applied thereto and horizontally oriented rays when a maximum amplitude voltage is applied thereto. Only those light rays emerging from rotator 15 which are polarized in the direction parallel with the plane of polarization 40 of a particular element in matrix 19 will be passed by the particular element. Thus, as the external control voltage applied to rotator 15 is changed, the plane of polarization of the emerging light changes and instantaneously a different analyzer element passes the light rays. Since the plane of polarization of the analyzer elements *a, b, c . . . n* changes either progressively, as indicated in FIG. 2, or in any other desired manner, analyzer 19 will cause light rays to scan or move from top to bottom, as oriented in FIG. 1, in a manner dependent on the control voltage. A screen or recording media, such as sensitized paper 23, is movable in a direction transverse to the movement of the light rays (out of or into the paper as oriented in FIG. 1) to provide a record of the deflection of the light rays.

Any voltage function applied to the rotator 15 will thus cause a discrete deflection of the light rays, and the device may be used as a recorder, printer or display device dependent on the material onto which the light beams or rays are directed.

The resolution of the system is determined by the polarizer and the resolution of each individual element in the matrix as well as by the number of analyzer elements employed.

FIG. 3 shows a system according to the invention used as a printer by means of which a complete line of printing can be formed on the recording media, i.e., a sensitized paper 23 during a given period. As will be appreciated, in FIG. 3 a number of systems, each similar to the one shown in FIG. 1, are positioned adjacent one another; however, a common light source, a common lens 13 and a common light polarizer 14 may be employed. A plurality of rotators 15, 15*a*, 15*b*, 15*n* are positioned to receive light from the polarizer 14; the rotators are electrically connected to the external control sources independently of one another. The light emerging from each of rotators 15, 15*a*, 15*b*, 15*n* is directed to analyzer matrices 19, 19*a*, 19*b*, 19*n*, respectively, and thence to the sensitized paper 23. As many rotators and analyzer matrices, etc., as are necessary to provide a full line of characters are utilized.

In order for each of the analyzer matrices to receive light from only its associated rotator, light shields 30, 30*a*, 30*b*, and 30*n* of any suitable type are positioned to shield the units from one another. Light condensing members 32, 32*a*, 32*b*, and 32*n*, and light conducting fibers 34, 34*a*, 34*b*, and 34*n* are mounted with respective analyzer matrices 19, 19*a*, 19*b*, and 19*n* to guide the light from each analyzer matrix to the desired spot on the paper 23.

Masks, of any suitable type and indicated by numbers 36, 36*a*, 36*b*, and 36*n*, on which are formed the characters to be printed, are placed intermediate the analyzer elements 19, 19*a*, 19*b*, 19*n* and the sensitized paper 23. The masks are formed so that, for example, when the light rays pass through the first element of analyzer, light rays in the form of, say, a character 1, impinge on the sensitized paper 23; or when light passes through a second analyzer element of an analyzer 19 a character, say a 2, is formed on the sensitized paper. Likewise, other desired characters may be formed on the paper when light rays pass through the other elements in analyzer 19. If a blank spot on paper 23 is desired, a mask on one of the elements may prevent light from passing therethrough.

Each of rotators 15, 15*a*, 15*b*, 15*n* are separately connected to respective control voltages and operate independently of each other so that the particular character printed by each rotator and the respective analyzer is independent of other characters printed on a line.

The operation of the system is similar to that described in connection with FIG. 1. For example, if the assumed character 1 is to be formed on the sensitized paper 23 by the channel comprising rotator 15 and analyzer 19, the signal voltage applied to rotator 15 causes the plane of polarization of the polarized light rays emerging from rotator 15 to rotate such that light rays pass only through that analyzer element and that portion of the associated mask to cause light rays in the form of a character 1 to impinge on the paper 23. Likewise, for the other rotators 15*a*, 15*b* . . . 15*n* and matrices 19*a*, 19*b* . . . 19*n*, a character will be formed on paper 23 corresponding to the signal voltage applied to the respective rotator. The condensing members 32, 32*a*, 32*b* . . . 32*n* and the fibers 34, 34*a*, 34*b* . . . 34*n* are arranged such that a single line of printing is formed on the paper 23 at a given time. The external control voltages and the light from source 11 are synchronized such that an element of each analyzer passes light during a given period so that a complete line of printing is formed on the sheet of sensitized paper 23 during a given period. Likewise, the control voltages are timed in relation to the movement of the paper such that distinct lines are printed on the paper.

Recording media are known in the art as direct printing paper which require no wet processing and achieve writing speeds of up to approximately 100,000 inches per second. Even at those high speeds of printing, actual operation of the system is limited only by the mechanical handling capability of the recording media, since the light pattern switching rates are in the millimicrosecond region.

While the invention has been particularly shown and described with reference to preferred embodiments thereof, it will be understood by those skilled in the art that the foregoing and other changes in form and details may be made therein without departing from the spirit and scope of the invention.

What is claimed is:

1. An apparatus for controlling rays of light to impinge on a receiving surface at determined positions, comprising means for rotating polarized light as a function of an applied voltage, an analyzer matrix comprising a plurality of elements, arranged to receive said rotated light, and each of said elements arranged to pass light rays having distinct planes of polarization whereby said matrix moves the light rays over said surface as a function of the control voltage.

2. An apparatus for controlling rays of light to impinge on a receiving surface at determined positions comprising means for rotating polarized light as a function of an applied voltage, and an analyzer arranged to receive said rotated light and to pass light rays having different planes of polarization along distinct portions of its length whereby said light rays impinge on said receiving surfaces at positions which are a function of the control voltage.

3. Apparatus in accordance with claim 1 wherein said analyzer matrix comprises a plurality of individual crystals stacked on one another, one of said crystals arranged to pass polarized light having one plane of polarization, successive ones of said crystals arranged to pass polarized light having planes of polarization which are rotated distinct amounts with respect to the plane passed by said one crystal.

4. An apparatus for controlling light rays to impinge on a receiving surface at determined positions, comprising means for polarizing light, means for rotating the plane of polarization of the polarized light in response to a control voltage, an analyzer matrix comprising a plurality of elements arranged to receive said rotated light and, each element passing light rays having distinct planes of polarization whereby said matrix provides an output of light rays which impinge on said surface at positions which are a function of the control voltage.

5. An apparatus for forming a series of characters on a light sensitive surface comprising means for polarizing light; a plurality of light ray processing channels; each of said channels including means for rotating the plane of polarization of the polarized light in response to a control voltage, an analyzer matrix comprising a plurality of elements, each of said elements arranged to pass light rays having a discrete plane of polarization, and masking means for each of said elements for passing light rays in the form of intelligence characters, said masking means being positioned intermediate said analyzer matrix and said surface; means for applying control voltages to said channels concurrently whereby said channels operate to concurrently form a series of characters on the sensitive surface.

6. An apparatus for forming a series of characters on a light sensitive surface comprising means for polarizing light; a plurality of light ray processing channels; means in each channel for rotating the plane of polarization of the polarized light in response to a control voltage, an analyzer matrix comprising a plurality of elements arranged to receive said rotated light, each of said elements arranged to pass light rays having a distinct plane of polarization, means for forming the light rays by said matrix into intelligence characters, and means for applying control voltages to said channels concurrently whereby said channels form a series of characters on the sensitive surface.

7. An apparatus for forming lines of intelligence characters on a receiving surface comprising in combination; means for polarizing light; a plurality of light ray processing channels; each channel including means for rotating the plane of polarization of polarized light in response to the amplitude of a control voltage, means for providing a control voltage of varying amplitude to each said light ray rotating means, an analyzer matrix comprising a plurality of stacked crystals, each crystal formed to pass light rays having a discrete plane of polarization, and masking means for passing light rays in the form of intelligence characters positioned intermediate said analyzer matrix and said receiving surface to pass light from each crystal in the form of an intelligence character; means for applying said control voltages to said channels concurrently whereby said channels operate to concurrently print a series of characters on said surface.

8. An apparatus for forming lines of intelligence characters on a receiving surface comprising in combination; means for polarizing light; a plurality of light ray processing channels; each channel including means for rotating the plane of polarization of polarized light in response to the amplitude of a control voltage, means for providing a control voltage of varying amplitude to each said light ray rotating means, an analyzer matrix comprising a plurality of stacked crystals, each crystal in said stack being formed to pass light rays having a distinct plane of polarization, each crystal after the first in said stack having planes of polarization which are progressively rotated with respect to the preceding crystal, masking means for passing light rays in the form of intelligence characters, said masking means being positioned intermediate said analyzer matrix and said receiving surface to pass light from each crystal to said surface in the form of a discrete character, and means for applying said control voltages to said channels concurrently whereby said channels operate to concurrently print a series of characters on said surface.

References Cited in the file of this patent

UNITED STATES PATENTS 2,002,515 Worrall ---------------- May 28, 1935